United States Patent [19]

Taumberger

[11] Patent Number: 4,591,711
[45] Date of Patent: May 27, 1986

[54] TRANSMITTING AND RECEIVING DEVICE FOR OPTOELECTRONIC COMMUNICATION SYSTEMS, AND METHOD OF MAKING THE DEVICE

[75] Inventor: Franz Taumberger, Munich, Fed. Rep. of Germany

[73] Assignee: Siemens Aktiengesellschaft, Berlin and Munich, Fed. Rep. of Germany

[21] Appl. No.: 551,460

[22] Filed: Nov. 14, 1983

[30] Foreign Application Priority Data

Dec. 3, 1982 [DE] Fed. Rep. of Germany ....... 3244867

[51] Int. Cl.$^4$ ............................................. G02B 6/42
[52] U.S. Cl. .................... 250/227; 250/239; 350/96.20
[58] Field of Search ............ 250/227, 551, 239; 350/96.20; 455/612

[56] References Cited

U.S. PATENT DOCUMENTS

| | | | |
|---|---|---|---|
| 4,118,100 | 10/1978 | Goell et al. ........................ | 350/96.20 |
| 4,222,629 | 9/1980 | Dassele et al. .................... | 350/96.20 |
| 4,346,294 | 8/1982 | Albaugh et al. ................... | 250/227 |
| 4,386,268 | 5/1983 | Kock .................................. | 250/227 |

OTHER PUBLICATIONS

Telcom Report 2 (1979) Special Issue "Digital Transmission" entitled Line Equipments for Optical Fiber Transmission by Jürgen Gier and Eberhard Kügler, pp. 111–117.

*Primary Examiner*—Edward P. Westin
*Attorney, Agent, or Firm*—Thomas H. Jackson

[57] ABSTRACT

A transmitting and receiving device for equipping optoelectronic communication systems with a metal case and a lead-in for a glass fiber through an outside wall of the metal case is disclosed. For such a device, a hermetically sealed lead-in for the glass fiber through the outside wall of the metal case shall be the result. For this purpose, the invention provides a metal tubing inserted in the outside wall of the metal case and a particularly designed metal ferrule-type connecting piece attached to the tubing. This combination results in an especially high-quality hermetically sealed lead-in for the glass fiber. The use of the transmitting and receiving device is advantageous in laser, transmitting, or PIN photodiode modules with so-called pigtail connections.

10 Claims, 3 Drawing Figures

TRANSMITTING AND RECEIVING DEVICE FOR OPTOELECTRONIC COMMUNICATION SYSTEMS, AND METHOD OF MAKING THE DEVICE

BACKGROUND OF THE INVENTION

The invention deals with a transmitting and receiving device for optoelectronic communication systems that contain electronic circuits housed in a metal case, and an opening in the outside wall of the metal casing for insertion of a glass optical fiber.

A device of this type is disclosed in TELCOM Report 2 (1979), supplement "Digital Transmission", at page 114.

For such transmitting and/or receiving devices it is often necessary to enclose a circuit module that has an optically coupled glass optical fiber in a hermetically sealed metal case. This requires a hermetically sealed lead-in for the glass fiber on the outside wall of the metal casing. This is especially important when unshielded semiconductor components are used.

A pigtail lead-in can be produced by bonding. However, this does not necessarily produce a hermetically sealed lead-in. A pressure seal imposes a relatively high mechanical stress on the fiber and is not sufficiently shock-resistant for many applications. Finally, experimentation has shown that soldering by applying a drop of solder may result in insufficient wetting of the glass fiber due to poor heat transfer on the fiber.

SUMMARY OF THE INVENTION

An object of the invention is to provide a transmitting and receiving device which has a hermetically sealed lead-in for the glass fiber which extends through the outside wall of the metal casing.

Another object of the invention is to provide a method for manufacturing a transmitting and receiving device which has a hermetically sealed lead-in for the glass fiber which extends to the outside wall of the metal casing.

In general, the invention features, in one aspect, a transmitting and receiving device for optoelectronic transmission systems having electronic circuits housed in a metal case and an opening on the outside wall of the metal casing for insertion of a glass optical fiber, in which metal tubing is inserted in the outside wall of the metal case to provide a hermetically sealed lead-in for the glass optical fiber, and a metal ferrule-type connecting piece soldered to the outside of the metal tubing at its larger inside diameter end, and to the glass fiber passing through the connecting piece at its smaller inside diameter end to form a hermetic seal, and the tubing is metalized in the area of the connecting piece.

This measure results in a hermetically sealed, especially high-quality lead-in for the glass fiber through the metal wall. The thorough wetting of the fiber in the small solder space and the especially good heat transfer from the connecting piece to the glass fiber are of particular advantage.

Furthermore, the short recess in the connecting piece can be gold-plated considerably easier than the unavoidably longer lead-in tubing in the casing.

In a further development of the invention, the connecting piece is dimensioned in such a way that it can be easily readjusted on the tubing prior to being soldered to it. Such a design of the transmitting and receiving device permits fine-adjustment of the end of the glass fiber protruding from the associated transmitting and receiving element by simply readjusting the connecting piece.

In a further development of the invention, the connecting piece is attached to the tubing outside the case.

In general, the invention features, in another aspect, a method of manufacturing a transmitting and receiving device of the above type which includes the steps of first soldering the connecting piece to the glass fiber, inserting the prepared glass fiber into the tubing, sliding the connecting piece over the tubing, and after adjusting and permanently positioning the glass fiber, flux-less soldering the connecting piece to the tubing.

On the other hand, it may prove practical to attach the connecting piece to the tubing outside the case.

In a further development of the invention, a method for manufacturing a transmitting and/or receiving device which can be used advantageously when the connecting piece is arranged inside or outside the case consists of attaching and soldering the connecting piece to the tubing during manufacturing of the case, inserting the glass fiber into the tubing and permanently positioning it after adjustment, and soldering the glass fiber to the connecting piece after having been permanently positioned.

In a further development of the invention, the metal coating of the glass fiber includes several layers comprising a platinum layer placed over a chromium layer, which is followed by a gold layer and a layer made of tin-lead alloy.

Other features and advantages of the present invention will become apparent from the following detailed description, and from the claims.

For a full understanding of the present invention, reference should now be made to the following detailed description and to the accompanying drawings.

BRIEF DESCRIPTION OF THE DRAWINGS

The invention will be explained in detail with reference to the following figures.

Figure 1:
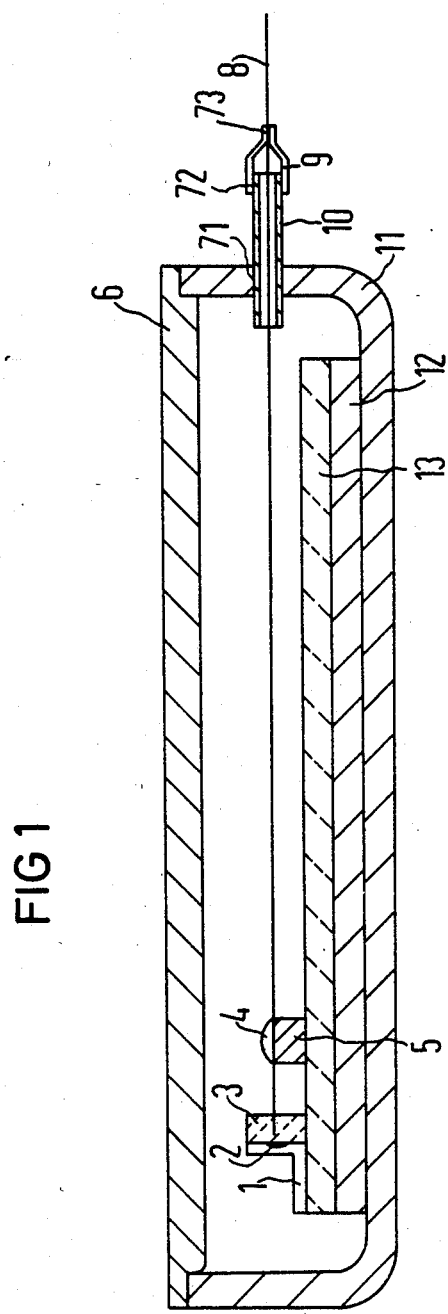
FIG. 1 shows the design of a receiving device where a PIN diode is arranged in a hermetically sealed circuit module and optically coupled by a glass fiber.
Figure 2:
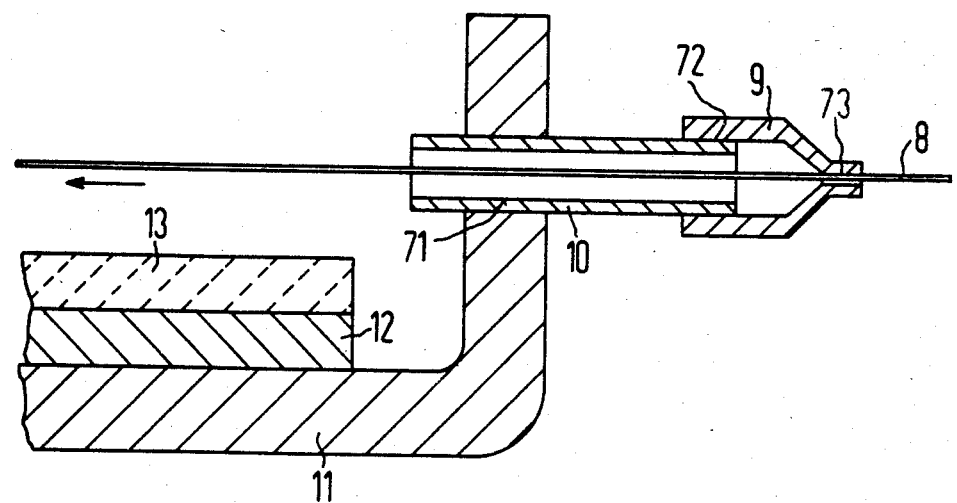
Figure 3:
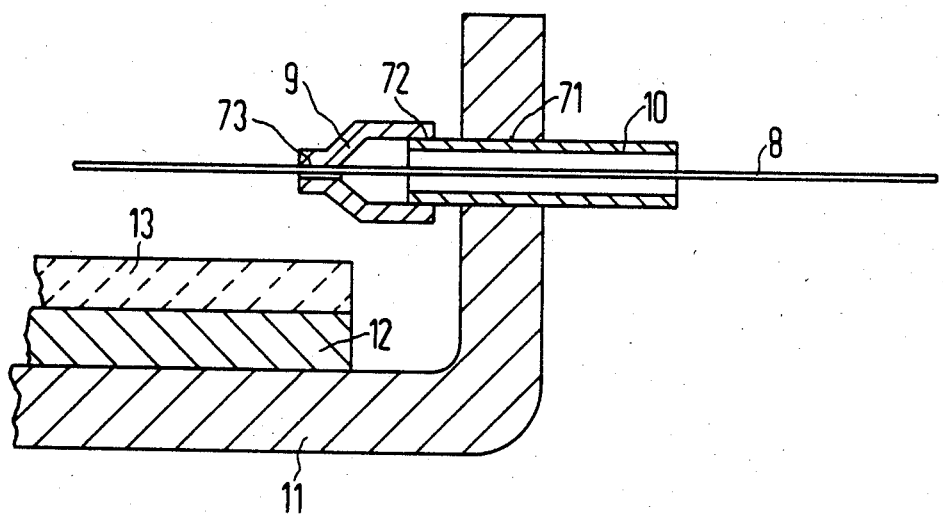

Details of the receiving device according to FIG. 1 are shown in FIGS. 2 and 3 as follows:

FIG. 2 shows further details of the lead-in for the glass fiber through the outside wall of a hermetically sealed metal casing; and FIG. 3 shows the receiving device shown in FIG. 1, modified so that the connecting piece is arranged inside instead of outside the metal casing.

DETAILED DESCRIPTION

The receiving device shown in FIG. 1 is housed in metal case 11 which is closed with lid 6. Spacer 12 is located on the bottom of square metal case 11. Spacer 12 holds circuit module 13 which is plate-shaped and is arranged parallel to the bottom of metal case 11 at a distance predetermined by spacer 12.

Tubing 10 is mounted in a hole 71 of a side wall of metal case 11 and protrudes from the side wall on both the inside and outside. Ferrule-type connecting piece 9 is mounted with its larger opening over tubing 10 protruding from the outside and through whose smaller opening optical fiber 8 is passed. Optical fiber 8 passes through connecting piece 9, tubing 10, and, via block 5, through an opening in diode holder 3 to the optical window of PIN photodiode 2. The position of optical guide 8, consisting of a glass fiber, is fixed at two points. These points are on block 5 and inside connecting piece 9 on the end of the ferrule-type connecting piece with the smaller inside diameter.

Diode holder 3 is attached to circuit module 13 by two metal brackets 1. The two metal brackets, of which only one is visible in FIG. 1, are located next to PIN diode 2.

PIN photodiode 2 is used here and has an optical window with a diameter of approximately 30 to 200 microns in the center of the back-side bond and, opposite of it, a bond pad on the front side.

Optical guide receiving module 13 is located in hermetically sealed metal case 11. Metal case 11 is equipped with a hermetically sealed glass fiber lead-in producing a so-called pigtail connection for the optical transmission. The hermetic casing which serves as shielding and/or corrosion protection is particularly practical when using unshielded semiconductor components, such as semiconductor chips.

The glass fiber lead-in consists of tubing 10 placed in the outer wall of case 11 and connecting piece 9 attached to tubing 10.

Following mounting of circuit module 13 in case 11, glass fiber 8 is passed through the lead-in and optically coupled to PIN photodiode 2. For this, optical fiber 8 is adjusted precisely before the optical window, and then held in position on block 5 by a fixing means 4, for example solder.

To obtain a hermetic seal, the glass fiber is soldered into connecting piece 9. The diameter of the smaller opening in connecting piece 9 is greater than the glass fiber diameter by about 120 microns. For a glass fiber with an outside diameter of 125 microns, an opening with a diameter of about 150 microns in connecting piece 9 is practical. Tubing 10 has the advantage of a considerably larger inside diameter, which is approximately greater than 0.5 mm.

Connecting piece 9 has the shape of a ferrule and provides, as a so-called solder coupling, a transition from a large to a small diameter. It consists of two hollow cylinders with an intervening hollow cone-shaped part, and is equipped with a solderable surface on the side. The thickness of the ferrule walls is approximately the same over its entire range. One of the hollow cylinders is sized to fit onto the tubing.

The glass fiber fits into the other hollow cylinder resulting in a transition from the inside diameter of the tubing to the outside diameter of the glass fiber.

This results in a very small solder gap 73 with a particularly good heat transfer from the solder coupling to glass fiber 8. For this reason, hermetic encapsulation of case 11 is considerably facilitated by means of connecting piece 9.

In the case of the device shown in FIG. 2, connecting piece 9 is located outside case 11. The preferred way to produce this device is as follows:

First, the solder coupling, i.e., connecting piece 9, is soldered to glass fiber 8. Then, a special metallization of successive layers of chromium, platinum, and gold is evaporated onto prepared glass fiber 8, which is then hot-dipped in an alloy of tin and lead so that the layer thicknesses are preferably 30, 100, 1000, and 1000 nm. Following metallization, glass fiber 8 is broken on the front side and, together with connecting piece 9 soldered to it, inserted into tubing 10.

Subsequently, connecting piece 9 is slid over tubing 10 and connected with this tubing by soldering.

Metallization has the advantage of preventing alloy break-down during soldering. At the same time, it offers an effective mechanical protection of the glass fiber during handling.

When performing fine adjustments of the end of glass fiber 8 in front of PIN diode 2, connecting piece 9 on tubing 10 can be easily adjusted in the axial direction of glass fiber 8 or in the direction of the Z axis. After glass fiber 8 has been adjusted and permanently positioned, connecting piece 9 is soldered without flux to tubing 10 at the connecting region 72.

In the case of the device shown in FIG. 3, connecting piece 9 is located inside case 11. The preferred method for producing this device is as follows:

Connecting piece 9 is already soldered to tubing 10 on the inside of case 11 during the manufacturing of case 11. The entire case 11 is then gold-plated. Glass fiber 8 is passed through the lead-in, consisting of tubing 10 and connecting piece 9, adjusted at PIN photodiode 2, permanently positioned, and subsequently soldered to connecting piece 9.

The method described for manufacturing the device shown in FIG. 3 is also useful for manufacturing the device shown in FIG. 2. Except for the fact that in this case connecting piece 9 is soldered to the outside of case 11 instead of to the inside, all other procedural steps are applicable as described.

The receiving device shown in the figures contains a PIN photodiode as the receiving diode. In the case of a transmitting device, for example, a laser diode or light-emitting diode is used as the transmitting diode in place of the receiving diode.

There has thus been shown and described a novel device for transmitting and receiving optoelectronic communication systems, and a novel method of making the device which fulfills all the object and advantages sought. Many changes, modifications, variations and other uses and application of the subject invention will, however, become apparent to those skilled in the art after considering this specification which discloses embodiments thereof. All such changes, modifications, variations and other uses and applications which do not depart from the spirit and scope of the invention are deemed to be covered by the invention which is limited only by the claims which follow.

What is claimed is:

1. In a transmitting and receiving device for optoelectronic transmission systems having electronic circuits housed in a metal case and an opening on the outside wall of the metal casing for insertion of a metalized glass optical fiber, the improvement comprising metal tubing inserted in the outside wall of said metal case to provide an hermetically sealed lead-in for said glass optical fiber, wherein a metal ferrule-type connecting piece is soldered to an end of said metal tubing at a larger inside diameter end of the connecting piece and to said metalized glass fiber passing through said connecting piece at its smaller inside diameter end having a small solder gap to form an hermetic seal, and said tubing is metalized in the area of said connecting piece.

2. The improvement of claim 1, wherein said larger inside diameter of said connecting piece is dimensioned relative to an outside diameter of said tubing end so that it can be easily adjusted prior to soldering to said tubing.

3. The improvement of claim 1, wherein said connecting piece is attached to said tubing outside said case.

4. The improvement of claim 2, wherein said connecting piece is attached to said tubing outside said case.

5. The improvement of claim 1, wherein said connecting piece is attached to said tubing inside said case.

6. The improvement of claim 2, wherein said connecting piece is attached to said tubing inside said case.

7. The method of manufacturing a transmitting and receiving device for optoelectronic transmission systems having electronic circuits housed in a metal case and an opening on the outside wall of the metal casing for insertion of a metalized glass optical fiber, a metal ferrule-type connecting piece soldered to one end of said metal tubing at a larger inside diameter end of the connecting piece and to said glass fiber passing through said connecting piece at its smaller inside diameter end having a small solder gap to form a hermetic seal, wherein said larger inside diameter of said connecting piece is dimensioned to be easily adjusted prior to soldering to said tubing, and said conecting piece is attached to said tubing outside said case, comprising the approximately sequential steps of:
  (a) Soldering said connecting piece to said glass optical fiber at said small solder gap;
  (b) Metallizing the glass fiber with a particular metalization material;
  (c) Inserting said optical fiber into said tubing;
  (d) Sliding said connecting piece over said tubing;
  (e) Adjusting said glass fiber for coupling to an optical transmitting or receiving device;
  (f) Positioning said glass fiber permanently; and
  (g) Soldering said connecting piece to said tubing without flux.

8. The method of claim 7, wherein the metalization material includes several layers comprising a chromium layer, a platinum layer, a gold layer, and a layer of tin and lead alloy.

9. The method of manufacturing a transmitting and receiving device for optoelectronic transmission systems having electronic circuits housed in a metal case and an opening on the outside wall of the metal casing for insertion of a metalized glass optical fiber, a metal ferrule-type connecting piece soldered to one end of said metal tubing at a larger inside diameter end of the connection piece and into said glass fiber passing through said connecting piece at its smaller inside diameter end having a small solder gap to form a hermetic seal, wherein said larger inside diameter of said connecting piece is dimensioned to be easily adjusted prior to soldering to said tubing, and said connecting piece is attached to said tubing inside or outside said case, and already soldered to it during manufacturing of said case, comprising the approximately sequential steps of:
  (a) Inserting said optical fiber into said tubing and connecting piece assembly;
  (b) Adjusting said glass fiber for optical coupling to an optical transmitting or receiving device;
  (c) Positioning said glass fiber permanently by at least soldering said glass fiber to said connecting piece at said small solder gap.

10. The method of claim 9, wherein said case is gold-plated after said connecting piece is soldered to said tubing.

* * * * *